(12) United States Patent
Hamilton et al.

(10) Patent No.: US 12,085,361 B2
(45) Date of Patent: Sep. 10, 2024

(54) DUAL FOCAL PLANE RETICLES FOR OPTICAL SIGHTING DEVICES

(71) Applicant: Sheltered Wings, Inc., Barneveld, WI (US)

(72) Inventors: David M. Hamilton, Barneveld, WI (US); Samuel J. Hamilton, Barneveld, WI (US)

(73) Assignee: Sheltered Wings, Inc., Barneveld, WI (US)

( * ) Notice: Subject to any disclaimer, the term of this patent is extended or adjusted under 35 U.S.C. 154(b) by 717 days.

(21) Appl. No.: 17/154,526

(22) Filed: Jan. 21, 2021

(65) Prior Publication Data

US 2021/0239425 A1 Aug. 5, 2021

Related U.S. Application Data

(63) Continuation of application No. 14/742,415, filed on Jun. 17, 2015, now Pat. No. 10,900,745, which is a
(Continued)

(51) Int. Cl.
*F41G 1/34* (2006.01)
*F41G 1/38* (2006.01)
(Continued)

(52) U.S. Cl.
CPC ............... *F41G 1/345* (2013.01); *F41G 1/38* (2013.01); *F41G 1/473* (2013.01); *G02B 27/32* (2013.01)

(58) Field of Classification Search
CPC . F41G 1/345; F41G 1/38; F41G 1/473; F41G 1/32; F41G 1/34; G02B 27/32;
(Continued)

(56) References Cited

U.S. PATENT DOCUMENTS

| 4,403,421 A | 9/1983 | Shepherd |
| 5,491,546 A | 2/1996 | Wascher et al. |

(Continued)

FOREIGN PATENT DOCUMENTS

| CA | 2041602 A1 | 6/1992 |
| WO | 2010129732 A1 | 11/2010 |

(Continued)

OTHER PUBLICATIONS

International Search Report and Written Opinion for International Application No. PCT/US2016/037594 dated Sep. 29, 2016.
(Continued)

*Primary Examiner* — Stephone B Allen
*Assistant Examiner* — Adam W Booher
(74) *Attorney, Agent, or Firm* — Husch Blackwell LLP

(57) ABSTRACT

A dual focal plane optical sighting device, such as a riflescope, having two focal planes, with a first reticle at the first focal plane, and a second reticle at the second focal plane. The reticle at the first focal plane is a glass etched reticle; the reticle at the second focal plane is a wire reticle. The two reticles have different patterns or markings providing the appearance of a single reticle or complementary markings when viewed through the optical sighting device.

9 Claims, 19 Drawing Sheets

Related U.S. Application Data continuation-in-part of application No. 14/478,697, filed on Sep. 5, 2014, now abandoned.

(60) Provisional application No. 61/874,840, filed on Sep. 6, 2013.

(51) Int. Cl.
*F41G 1/473* (2006.01)
*G02B 27/32* (2006.01)

(58) Field of Classification Search
CPC ........ G02B 27/34; G02B 23/00; G02B 6/001; G02B 6/0045
See application file for complete search history.

(56) References Cited

U.S. PATENT DOCUMENTS

| | | | |
|---|---|---|---|
| 6,729,062 B2 * | 5/2004 | Thomas | ................... F41G 1/38 42/130 |
| 7,627,976 B1 | 12/2009 | Olson | |
| 9,616,603 B2 | 4/2017 | Haupt | |
| 10,823,531 B2 * | 11/2020 | Bellah | .................... F41G 1/345 |
| 10,900,745 B2 * | 1/2021 | Hamilton | .................. F41G 1/38 |
| 2002/0124452 A1 | 9/2002 | Sammut | |
| 2003/0086165 A1 | 5/2003 | Cross et al. | |
| 2010/0301116 A1 | 12/2010 | Bennetts et al. | |
| 2011/0280040 A1 | 11/2011 | Schick et al. | |
| 2013/0033746 A1 | 2/2013 | Brumfield | |
| 2013/0170027 A1 | 7/2013 | Peters et al. | |
| 2014/0373424 A1 | 12/2014 | Silvers et al. | |

FOREIGN PATENT DOCUMENTS

| | | |
|---|---|---|
| WO | 2013106280 A1 | 7/2013 |
| WO | 2014051810 A1 | 4/2014 |
| WO | 2014084926 A1 | 6/2014 |

OTHER PUBLICATIONS

Extended Search Report issued for European Patent Application No. 21171283.1 dated Jul. 22, 2021, 9 pages.

* cited by examiner

DUAL FOCAL PLANE RETICLES FOR OPTICAL SIGHTING DEVICES

CROSS-REFERENCE TO RELATED APPLICATIONS

This application is a continuation application of U.S. patent application Ser. No. 14/742,415 filed Jun. 17, 2015, which is a continuation-in-part application of U.S. patent application Ser. No. 14/478,697 filed Sep. 5, 2014, now abandoned, which claims priority to and is a non-provisional application of Provisional Application No. 61/874,840 filed Sep. 6, 2013, all of which are incorporated herein by reference in their entirety for all purposes.

FIELD

The disclosure relates generally to optical sighting devices for use with firearms. More particularly, the disclosure relates to reticles for use in a dual focal plane optical sighting device.

BACKGROUND

Reticles are used in optical sighting devices for aiming and for measuring distances or sizes of objects. Various types of reticles can be used in optical sighting devices, such as riflescopes. Wire crosshairs have been used in reticles for many years.

More recently, glass etched reticles have become popular in sighting devices used in the consumer, military, and law enforcement markets. A glass etched reticle is a piece of glass with a pattern etched into the glass then, using a vapor deposit chamber, various substances can be deposited into the etched pattern. For black features, chrome is generally used. For "illuminated" features, titanium dioxide or sodium silicate is generally used. This fine powder reflects light from a LED, which is positioned at the edge of the reticle housing and out of view of the user, towards the user's eye, and makes the reticle pattern appear to glow so it is easy to see in low light situations.

Most optical sighting devices with variable magnification have two focal planes. Generally a reticle could be placed at the first focal plane, the second focal plane or both. There are distinct advantages and disadvantages to both first and second focal plane reticles.

First focal plane reticles generally have smaller features, which usually prevents the use of wire reticles, because the wires are too big. Therefore, glass etched reticles are generally used for first focal plane reticles. Since the first focal plane is in front of the zoom magnification system (that is, the erector system), the reticle and image will change in size in proportion to one another: when the image gets bigger, the information on the reticle gets bigger at the same rate. One advantage to this is that any measurement marks on the reticle will be accurate at any magnification setting the user chooses. As the image is magnified, the information on the reticle appears to get larger along with the image at the same rate, so all reticle markings will be accurate to its designed scale of measurement. One disadvantage, however, is that as the lines which make-up the reticle will get thicker to the user's eye, it may become difficult to see small targets because more of the viewable area is obscured. If the lines are made too thin, at low magnification (desirable for larger fields of view and moving targets) the lines could be too thin to be seen clearly. On the other hand, if the lines are thicker and work well at low magnification, they may appear to be too thick at higher magnifications.

In second focal plane reticles, by contrast, the advantages and disadvantages are largely the opposite of those of first focal plane reticles. Second focal plane reticles do not adjust in size or scale when the magnification of the image is changed because they are located behind the erector system. Therefore, a second focal plane reticle is generally sized for a specific magnification setting of the riflescope. In order for the measurement marks on a second focal plane reticle to be accurate, the scope must be set at a precise magnification setting for which the given reticle is designed. In order to use the measurement marks in another magnification, therefore, the user would need to mathematically calculate the difference for accurate use. Because the thickness of the lines on a second focal plane reticle do not change with the magnification setting, the lines can be optimized for a desired thickness, and at any magnification the lines will appear the same thickness to the user's eye.

Some trends in current sighting devices are worth noting. For example, there is a trend in sighting devices to have an increased magnification range. It is not uncommon for scopes to have 6× magnification ranges and some scopes even have magnification ranges in the 10× or more range. As magnification ranges increase, it becomes more difficult to optimize the line thickness of reticles used in the first focal plane because there is a much larger change in reticle line size over the magnification range. Another trend is to use one optical sighting device for both long range situations and close range situations. Increased zoom ranges make it possible to have one optical sighting device that can be used for both very close and very far situations. However, because of the advantages and disadvantages described above, it is difficult to find a reticle that is optimal for both long range situations and close range situations.

In the last few years certain optical sighting devices have used dual focal plane reticles. This means that the device contains two reticles; one reticle in each of the first and second focal planes. Generally, most dual purpose (close and far application) reticles will have vertical and horizontal stadia lines with hash marks or some other shape designating specific angular measurements (e.g., Minutes of Angle or Milliradians) for long range shots. For shorter range shooting, a simple dot, horseshoe shape, broken circle, or some other mark is preferred. Both reticles in all dual focal plane optical sighting devices currently known to the inventors are glass etched reticles.

Reticle illumination has been used for many years in traditional style riflescopes, but there have been illumination problems. A discussion of glass reticle technology will be useful background. Years ago, glass reticles were invented because they had the advantage of enabling "floating" reticle features. The term "floating," when applied to a reticle, means that any design can be placed onto the glass surface without any other physical support, that is, the designs do not need to be connected. Floating reticles are unlike wire reticles, as the latter require all the reticle features to be supported by being connected to a frame in some way, much like a stencil or a neon sign. A glass reticle makes possible any pattern imaginable. As noted above, glass reticle makers will etch glass with a pattern, and then fill the etched areas with a various different materials, depending on different factors. Commonly, chrome is used as a material for filling the etched portion for use in non-illuminated features. For illuminated features, glass reticle makers commonly use a reflective material such as but not limited to titanium dioxide and sodium silicate. Usually, in a glass reticle there is a second piece of glass cemented over the reticle pattern to protect the pattern, thereby creating a doublet.

Most glass illuminated reticles are not bright enough, however to be used in bright daylight situations because current technology cannot make them bright enough. There are exceptions to this generality, but they also have their drawbacks. Traditional reticle illumination involves the use of an LED placed at the edge of the glass reticle. The light from the LED reflects off the reflective material towards the observer's eye, and thus creates an illuminated pattern. This method results in a desirable illuminated pattern for low light situations. But titanium dioxide and sodium silicate are actually very finely ground powders of these materials. When the light from the LED hits these materials, the light scatters light in all directions. Some of that light goes to the users eye. But it is obviously inefficient since it scatters light in all directions. The result is that not enough light is reflected for bright daylight situations.

One alternative way to provide brighter illumination is the use of light piped through an optic fiber to the center of the reticle to make a bright center dot or other shape. This is currently used in the Vortex Razor 1-6×24 scope, for example. The light piped through the optic fiber may be ambient light or may also be provided by an LED or other suitable light source. Illuminating the optic fiber with an LED results in a very bright reticle that can be seen in bright daylight, and does not dim when the user moves his head off axis. The problem with this design is that it can only be used in the second focal plane. The reason is that placement in the first focal plane would require the illuminated shape to be much smaller to appear the correct size to the user and it is difficult to get optic fibers sufficiently small, or at least to make the center dot that small. Also, using an optic fiber is difficult to do using glass reticle technology without making the fiber optic cable visible to the observer, which obstructs the view and is distracting. Moreover, optic fibers have the drawback of only having an illuminated center dot, or chevron, or other similarly small and compact shape. But disconnected entities are very difficult without multiple fibers. Other illumination types can result in a fully illuminated reticle pattern or a center pattern other than a simple dot. For example, wire reticles with optic fibers that are illuminated by LEDs have been used.

Another system used for bright illuminated patterns is diffraction grated reticles. Swarovski uses a diffraction grated reticle in its Z6 line of scopes. This technology does produce a very bright center dot. The problem is the manner in which the light is provided to the diffraction pattern. U.S. Pat. No. 7,804,643 B2 discloses a prism system which reflects light to the diffraction pattern to create a bright center dot. The problem with this design is that it relies on a relatively large prism system which needs to be placed on the edge of the scope housing. This arrangement makes it difficult to put an illuminated reticle in the first focal plane because the larger housing arrangement would likely interfere with the scope turrets. Another problem with this design is that the reticle moves much more in the first focal plane while adjusting the turrets. Because the prism functions to focus the light onto the diffraction pattern, this design requires focusing on a "moving target," meaning that the reflected light may not always be aimed properly onto the diffraction reticle pattern. Even if this prism arrangement could be made to work in the first focal plane, there would still be the problem of having an undesirably large housing on the scope body.

Others have used diffraction grated reticles in the first focal plane using a lens in combination with very tight tolerances. This provides the desired daylight brightness in the first focal plane, but as the user moves his head off axis, the brightness is lost, and in some cases the scope dims to almost black.

Alignment of dual focal plane reticles is also challenging. In many dual focal plane reticles, both reticles include vertical and/or horizontal stadia lines or markings including, but not limited to, "crosshair" lines. In addition, reticles also typically employ other markings including, but not limited to: subtension markings, hash marks, dots, horseshoes, or other shapes or patterns. Such markings may provide a shooter with information including, but not limited to, measuring distances, object sizes, and how to compensate for holdover and crosswinds. Including lines or markings on both reticles makes the alignment of the reticles to each other extremely important. If the reticles were to be misaligned for any reason, the user may see two sets of crosshairs and subtension marks, which would confuse and distract the shooter. Such misalignment could occur because the reticles are physically misaligned, or if the user simply turns his or her head off axis.

Although illuminated reticles have been used for many years, they have not been fully optimized. For example, the use of transparent organic light-emitting diode (OLED) screens or other electronic reticles is already known in the prior art, but improvements could be made on this technology. For example, U.S. Patent Application Publication Number 2013/0033746 discloses a transparent OLED screen reticle as well as other types of electronic reticles, and various electronic reticle shapes. One problem with electronic reticles including OLED reticles, however, is that if battery power is lost, so too is the reticle. In this situation, there are no aiming options. Another disadvantage is that it can be complicated to connect the OLED screen to the magnification. Such difficulty leads to more opportunities for failure and an increase in cost and complexity.

As such, there is a need for a dual focal plane reticle that eliminates the misalignment issues present when both the first focal plane reticle and second focal plane reticle include crosshairs and other marks. A need also exists for a reticle having improved illumination and reticle options.

SUMMARY

An optical sighting device includes an objective lens system having a center axis, an eyepiece lens, and an erector lens system forming an optical system having a first focal plane and a second focal plane, the first focal plane proximate the objective lens system, and the second focal plane proximate the eyepiece lens. The optical system has a first reticle at the first focal plane and a second reticle at the second focal plane. The reticle at the first focal plane is a glass etched reticle, and the reticle at the second focal plane is a wire reticle. The first reticle and the second reticle include at least one first marking and at least one secondary marking that complement each other to create the appearance of a single reticle when viewed along the center axis.

An alternative embodiment of the present invention is an objective lens system having a body with a center axis and with an objective lens system disposed within the body. An eyepiece lens is also disposed within the body. The objective lens system and the eyepiece lens are parts of an erector lens system that has a first focal plane and a second focal plane. A first reticle is disposed at the first focal plane and a second reticle, which is a wire reticle, is disposed at the second focal plane. The first reticle includes at least one first marking and the second reticle includes at least one second marking. The first and second markings do not overlap each other when viewed along the center axis.

Yet another embodiment of the present invention is an optical system for use in an optical sighting device that includes an objective lens system, an erector system, and an eyepiece. A glass etched reticle having a marking pattern is located at a first focal plane between the objective lens system and the erector system. A wire reticle including stadia lines is located at a second focal plane between the erector system and the eyepiece. The glass etched reticle and wire reticle are aligned to that the marking pattern of the glass etched reticle appears to be superimposed on the stadia lines of the wire reticle when the reticles are viewed through the eyepiece.

It will be understood by those skilled in the art that one or more aspects of this invention can meet certain objectives, while one or more other aspects can lead to certain other objectives. Other objects, features, benefits and advantages of the present invention will be apparent in this summary and descriptions of the disclosed embodiment, and will be readily apparent to those skilled in the art. Such objects, features, benefits and advantages will be apparent from the above as taken in conjunction with the accompanying figures and all reasonable inferences to be drawn therefrom.

DETAILED DESCRIPTION

Figure 1:
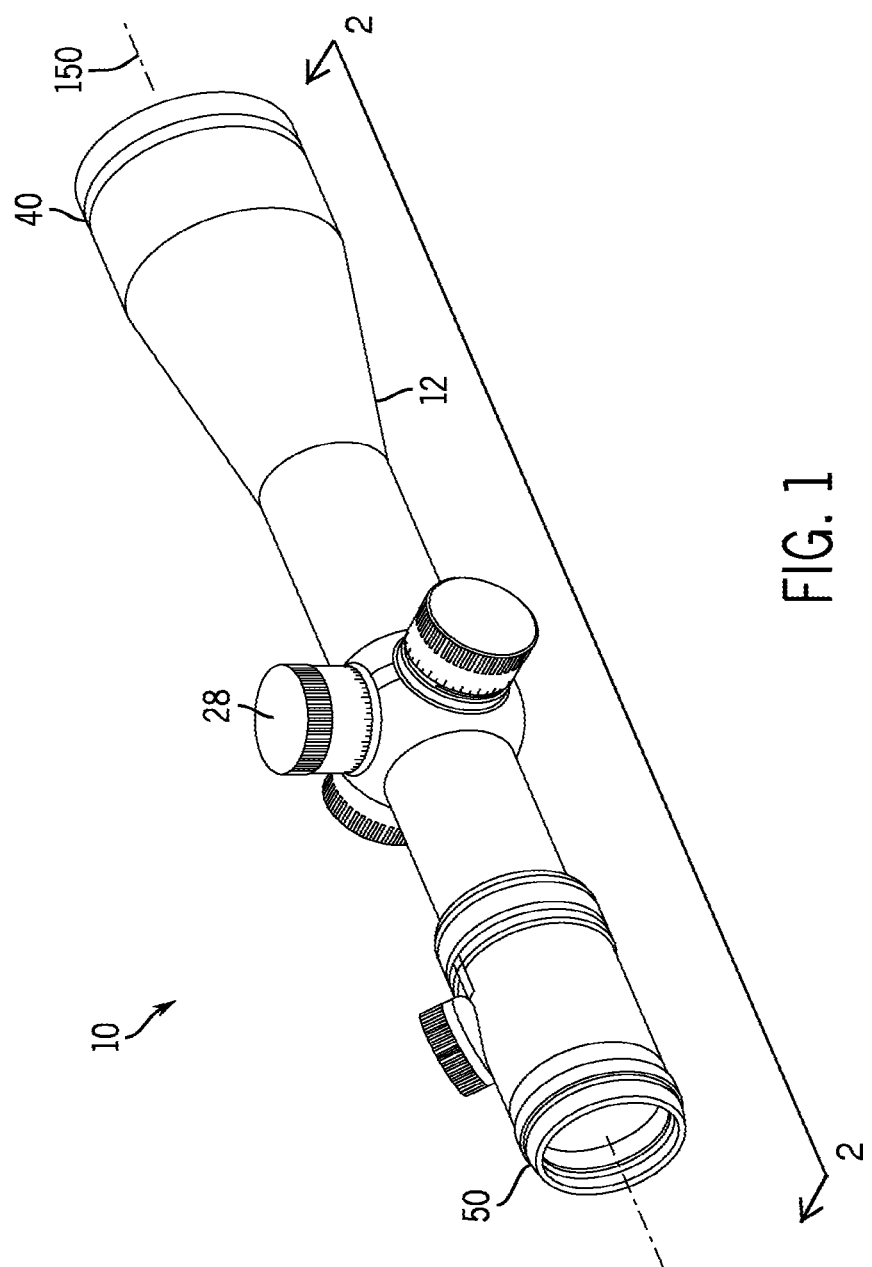
FIG. 1 is a perspective view of a riflescope optical sighting device in accordance with the present invention.
Figure 2:
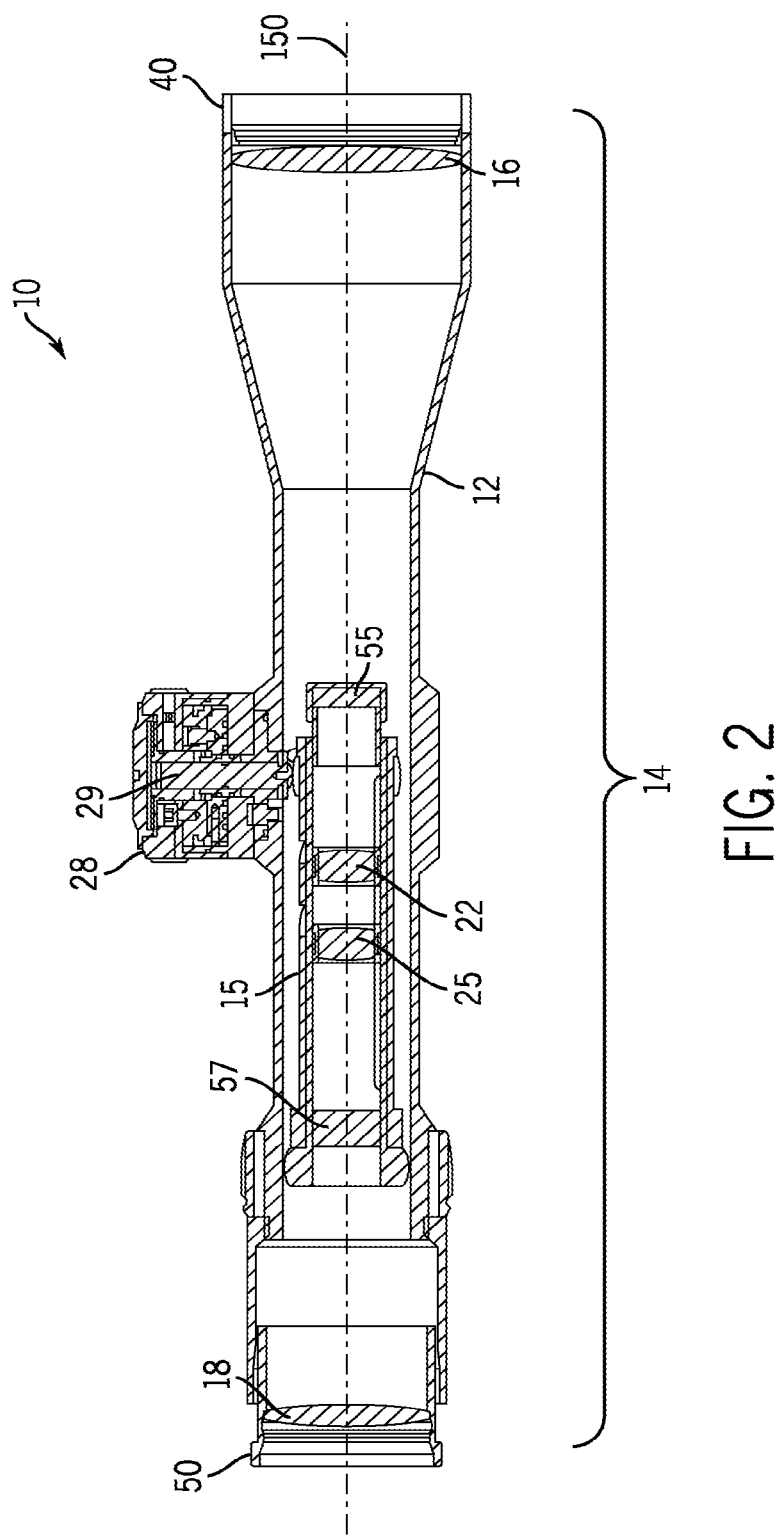
FIG. 2 is a cross-section view of the riflescope of FIG. 1 along line 2-2, showing a moveable optical element inside the scope body.

FIG. 1 shows an exemplary dual focal plane optical sighting device 10, having a scope body 12, objective lens end 40 and eyepiece end 50. FIG. 2 shows a cross-section of the sighting device from FIG. 1 showing the basic components of optical system 14 and moveable optical element 15. As shown in FIG. 2, optical system 14 includes an objective lens system 16, erector system 25, and eyepiece 18. FIG. 2 shows a riflescope embodiment of the invention having a body 12, but optical system 14 could be used in other types of sighting devices as well. Erector system 25 may be included within a moveable optic element 15. In FIG. 2, moveable optic element 15 also includes a collector 22, as well as first focal plane reticle 55 and second focal plane reticle 57. When in use, adjustment of turret assembly 28 and turret screw 29 causes adjustment of moveable optic element 15.

Figure 3:
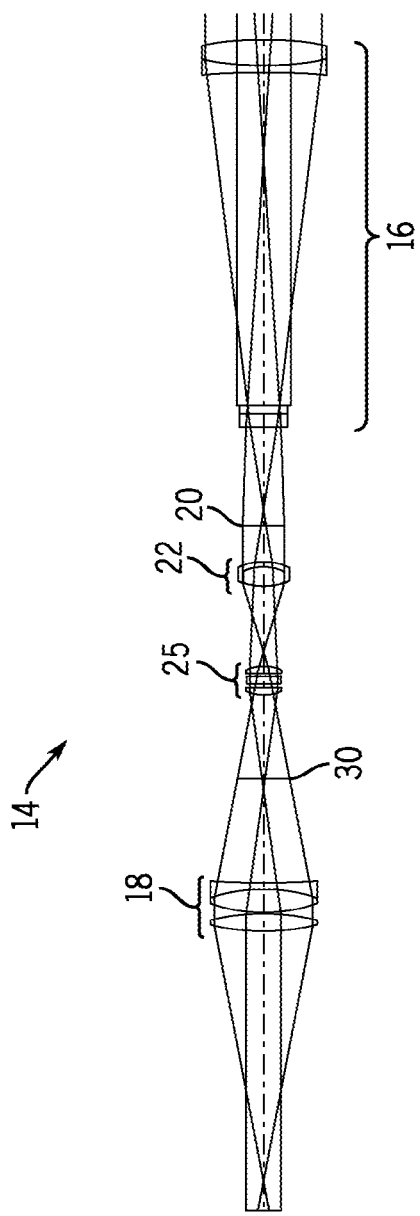
FIG. 3 is a schematic view of the erector system in the optical element of an optical sighting device in accordance with the present invention.

FIG. 3 shows a close-up view of an optical system 14 in cross-section, illustrating how light rays travel through the optical system 14. Optical system 14 may have additional optical components such as collector 22, and it is well known within the art that certain components, such as objective lens system 16, erector system 25, and eyepiece 18 may themselves have multiple components or lenses. Optical system 14 shown here is drawn as a basic system for illustration of one embodiment of the invention but it should be understood that variations of other optical systems with more or less structural components would be within the scope of the invention as well.

Figure 4:
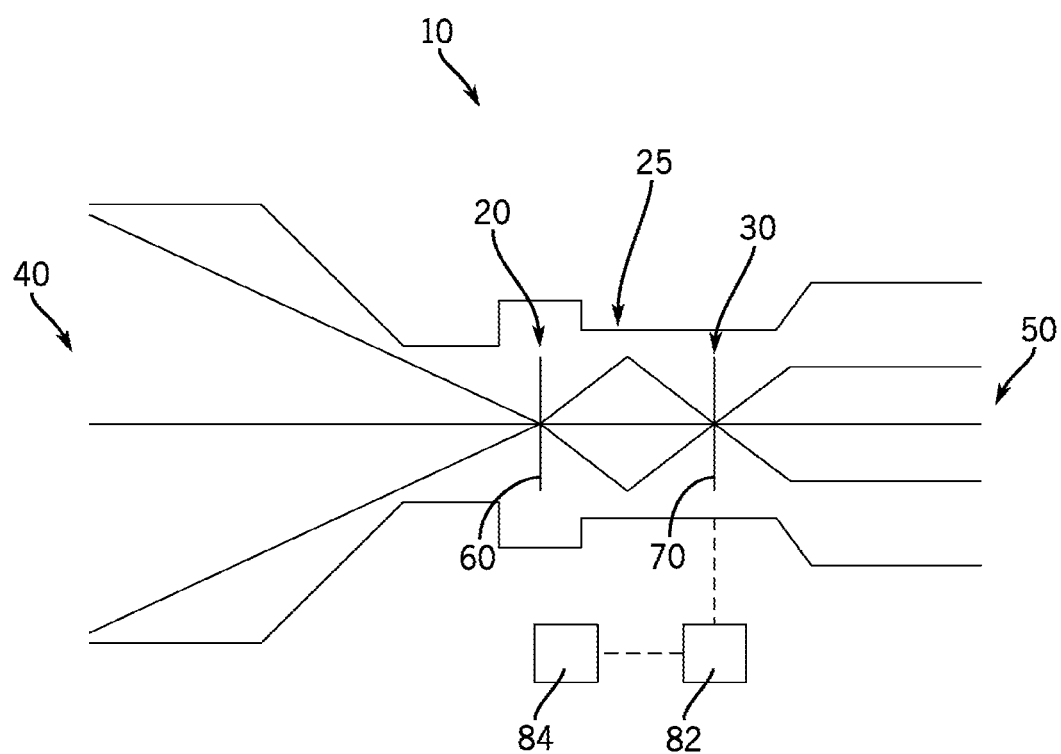
FIG. 4 is a schematic view of an optical sighting device with two focal planes and reticles at each focal plane.

FIG. 4 is a schematic drawing of the basic components of one embodiment of a dual focal plane optical sighting device 10, having an objective lens end 40 and an eyepiece end 50. The focal plane proximal to the objective lens end 40 is a first focal plane 20 (FFP). The focal plane closer to the eyepiece end is a second focal plane 30 (SFP). Light enters the objective lens end 40 and proceeds through the dual focal plane optical sighting device 10 and through the eyepiece end 50. As light passes through the dual focal plane optical sighting device 10, light is focused to form an image that is clear to the eye of a user at the first 20 and second 30 focal planes. Magnification occurs in an erector system 25 located between the first and second focal planes. FIG. 4 also shows optional components controller 82 and switch 84. Controller 82 may contain a chip with memory for storing various reticle patterns or other information used by the device.

Figure 6:
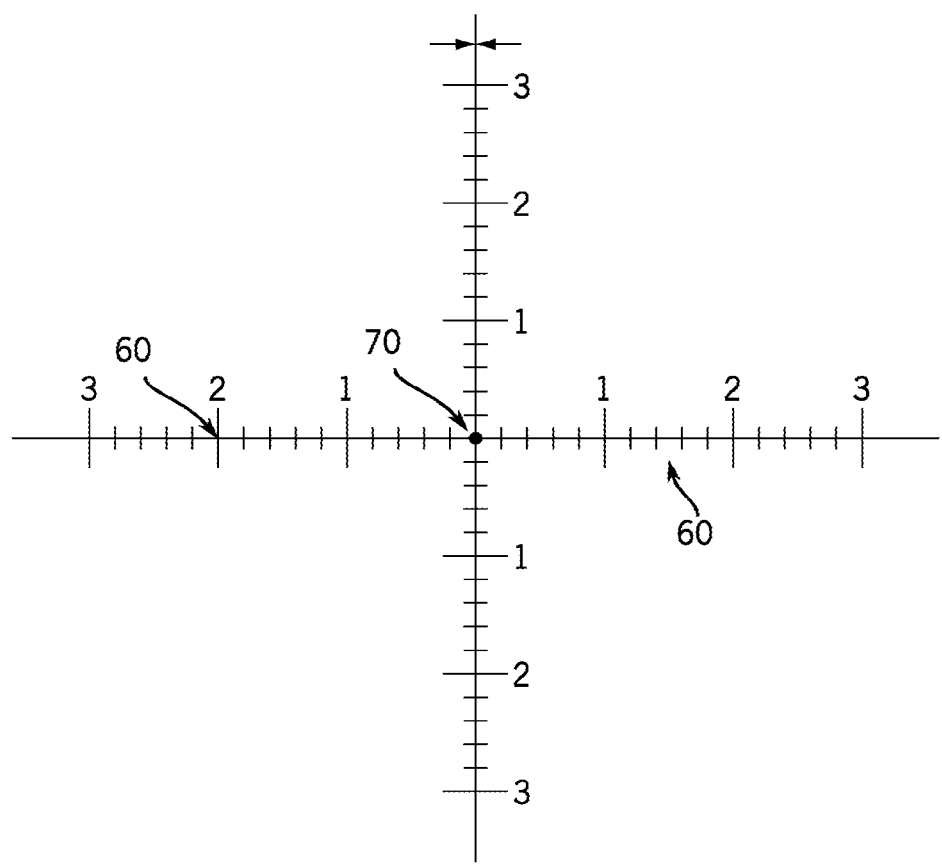
FIG. 6 is a view as seen when looking through a dual focal plane optical sighting device using glass and electronic reticles.

In one embodiment of a dual focal plane optical sighting device 10, a glass reticle 60 (such as a glass etched reticle) is positioned at the first focal plane 20 and an electronic reticle 70 (such as an OLED reticle) is positioned in the second focal plane 30. The pattern on the glass reticle 60 could be a cross hair with hash marks, for example, and the pattern of the electronic reticle 70 could be a dot as seen in FIG. 6. It should be understood that numerous other types and shapes of reticles and reticle patterns could be used as well.

In an alternate embodiment, the electronic reticle 70 is placed on the same focal plane as the glass reticle 60. In yet another alternate embodiment, the electronic reticle 70 could be positioned at the first focal plane 20 and the glass reticle 60 positioned at the second focal plane 30. In additional embodiments, wire reticles could be used in either focal plane position.

Figure 5:
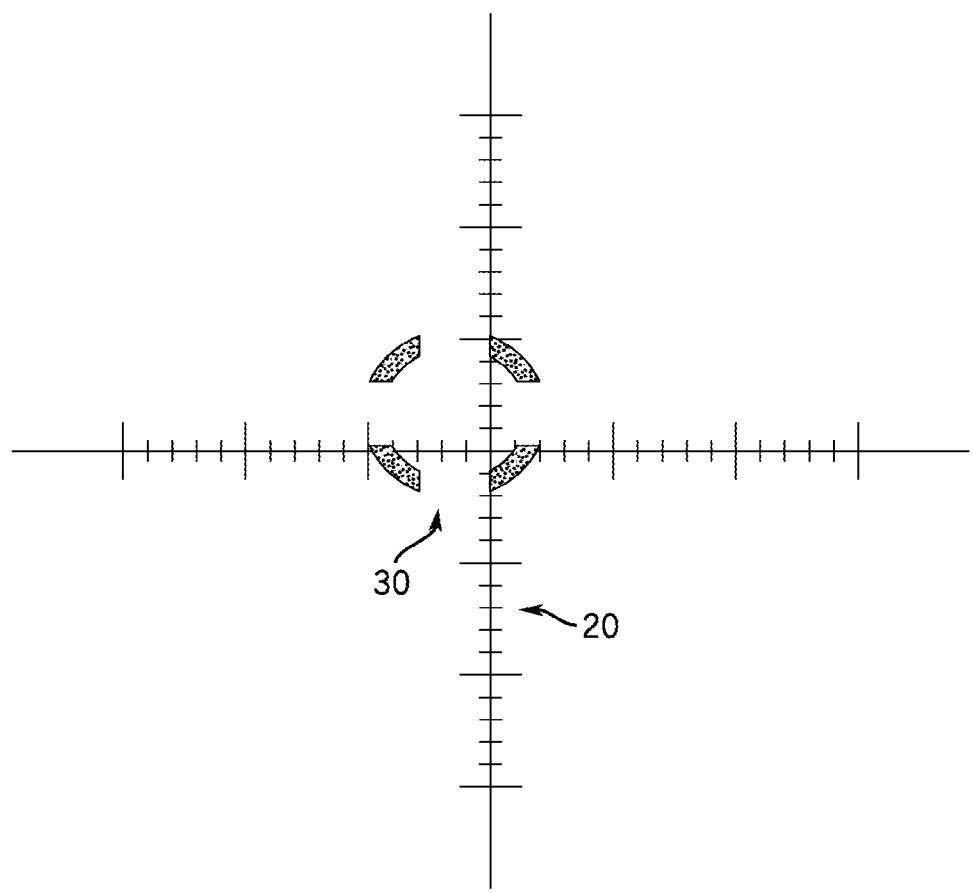
FIG. 5 is a view through a dual focal plane optical sighting device with dual reticles, where the two reticles are misaligned.
Figure 8:
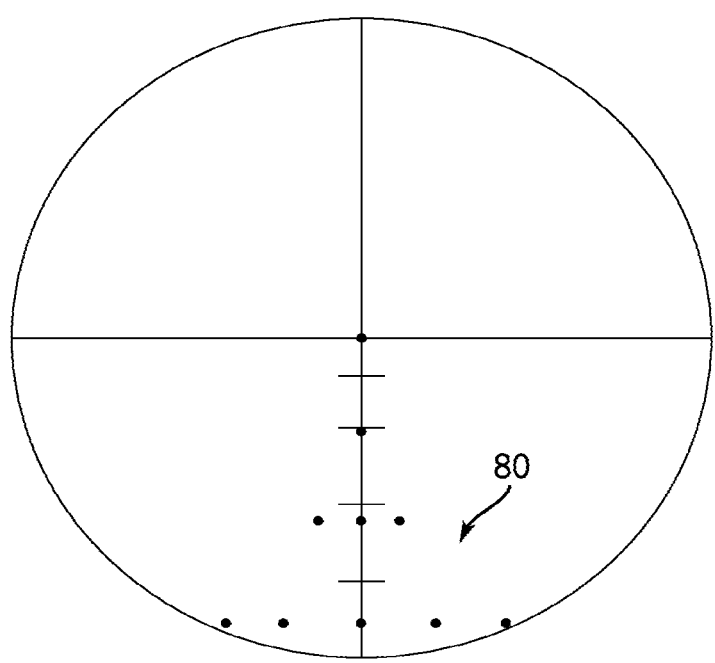
FIG. 8 illustrates an observed reticle with a marking pattern for use with a subsonic bullet.

With any dual focal plane optical sighting device, the two reticles have to be properly aligned so that when they are viewed by a user from the eye piece, the reticles appear aligned as seen in FIG. 8. If not properly aligned, the reticles may appear misaligned to the user's eye as shown in FIG. 5. If the alignment between the first focal plane reticle and the second focal plane reticle is off by only a small fraction of a millimeter, it will be very noticeable to the user. When the two reticles are properly aligned, it is called the "true position."

In a dual focal plane optical sighting device 10 the first focal plane 20 and second focal plane 30 may be rather far apart and the reticles themselves are physically rather small (although through the eyepiece they may appear large). For example, glass etched reticles are generally about 10 microns, and some reticles have lines that are 0.005 mm thick. As another example, the first focal plane and second focal plane could be separated by a distance of 50-100 mm within the body of a sighting device. As such, it is difficult to get a precise alignment over that distance. Alignment of such small reticles requires very small movements. If the dual focal plane optical sighting device features two glass etched reticles, alignment must be done mechanically to a high degree of precision, which is difficult and costly to accomplish. Alternatively, if the dual focal plane optical sighting device features two electronic reticles, a power failure results in having no reticle at all. Thus, one advantage of having one glass reticle 60 and one electronic reticle 70 in a dual focal plane optical sighting device 10 is to simplify the complexity and cost of mechanically aligning the two reticles. Dual reticle alignment can be simplified by requiring less or even no mechanical alignment, depending on the manufacturing process used. For example, electronic reticle 70 could be digitally aligned with glass etched reticle 60 using computerized or automated processes. Some OLED screen reticles have pixels that are under 5 microns. Since this is about half the line width of the glass reticle, it easier to align the digital reticle. Further, if a power failure occurs with the optical sighting device, the glass reticle will remain visible and operative as a backup aiming solution.

The dual focal plane optical sighting device 10 could also have a memory chip or internal processor, for example within controller 82, which contains various electronic reticle options, such as the dot from FIG. 6, the broken circle from FIG. 5 or a horseshoe. Additionally, a user interface such as a screen or dial could be used to toggle between the various reticle choices. Once two reticles within the dual focal plane optical sighting device 10 are digitally aligned, the electronic reticle options can be optimized to work with the glass reticle 60 and provide the user many reticle options to choose from.

In some embodiments, the optical sighting device 10 can also be particularly useful with firearms that can accommodate both a supersonic bullet and a subsonic bullet. For example, the 300 blackout bullet is a bullet that can be used either way, although in other rifles, different bullets can be used for each function. Supersonic is faster and carries more energy. Subsonic is much quieter, especially when used with a sound suppressor or silencer on a rifle. Certain shooters, such as special operations shooters, like to have both options, and like to interchange which bullet type they use based on the mission.

The optical sighting device 10 of this disclosure can accommodate this interchangeability. In one embodiment, the optical sighting device 10 is adapted to be used with a supersonic bullet and a subsonic bullet. The optical sighting device 10 can include a controller 82 including a memory chip or internal processor for causing at least two marking patterns to be displayed on the electronic reticle, the first pattern 75 illustrating hold over or angular markings for use with the supersonic bullet, and the second pattern 80 illustrating hold over or angular markings for use with the subsonic bullet, the second pattern having greater spacing between the markings than in the first pattern.

Figure 7:
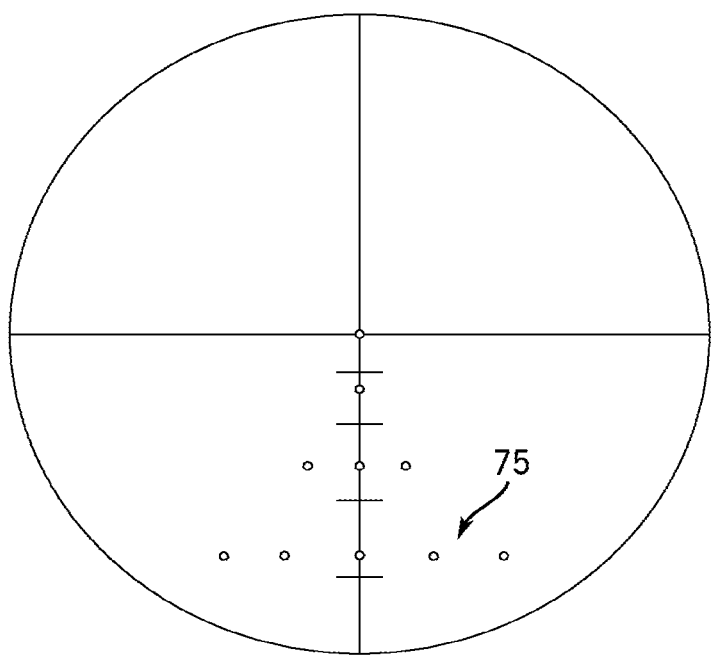
FIG. 7 illustrates an electronic reticle with a marking pattern for use with a supersonic bullet.

Further, when the glass reticle 60 is in the second focal plane with a few hash marks, and the electronic reticle 70 is in the first focal plane, a switch 84 on the riflescope changes a series of drop dots or other "hold over" aiming points or angular markings based on the bullet used (subsonic vs. supersonic). Different colors, shapes, or any combination thereof can be used to differentiate between the hold-over features, depending on whether supersonic or subsonic was selected. In the embodiment illustrated in FIGS. 7 and 8, pressing the switch 84 on the side of the device 10 changes the dots between a supersonic pattern (FIG. 7) and subsonic pattern (FIG. 8). Supersonic patterns and subsonic patterns may also be illuminated in different colors to further differentiate them. Any combination of colors and/or shapes could be used to denote between supersonic and subsonic. Since the subsonic is a slower bullet, it will see more bullet drop over a given distance than a supersonic bullet. As a result, the hold-over dots need to be spaced out more, as illustrated in comparing FIG. 7 and FIG. 8, in order to accommodate this greater amount of bullet drop. Again, one benefit of the second focal plane reticle illustrated in FIGS. 7 and 8 having glass etched markings, is that in the event that battery power fails (and thus the illuminated dots from the first focal plane reticle are unavailable), the shooter still has the benefit of the second focal plane reticle for reference.

In any of the embodiments disclosed herein, a glass etched or non-electronic reticle can also have basic angular markings (MOA or MRAD) hashed to be used if battery power fails, with the dots corresponding to a crosswind speed.

Figure 9A:
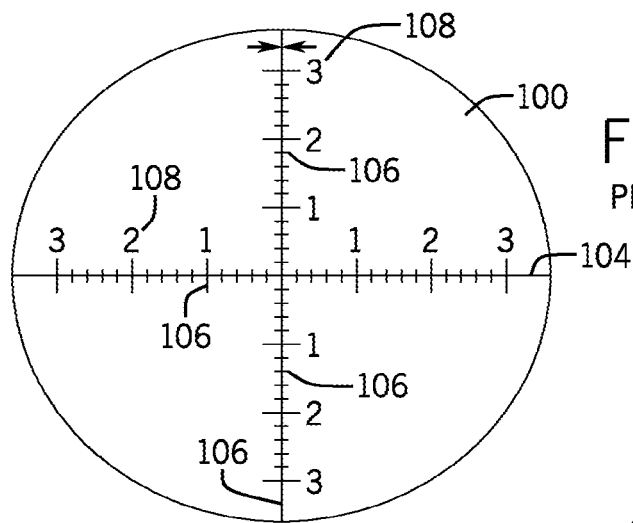
FIG. 9A is a view as seen when looking through a conventional dual plane optical sighting device of a first focal plane reticle having stadia and subtension lines.
Figure 9B:
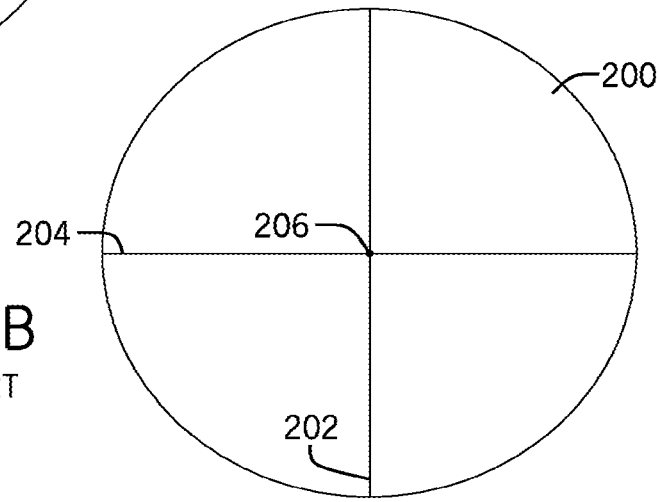
FIG. 9B is a view as seen when looking through a conventional dual plane optical sighting device of a second focal plane reticle having stadia lines and a targeting dot.
Figure 9C:
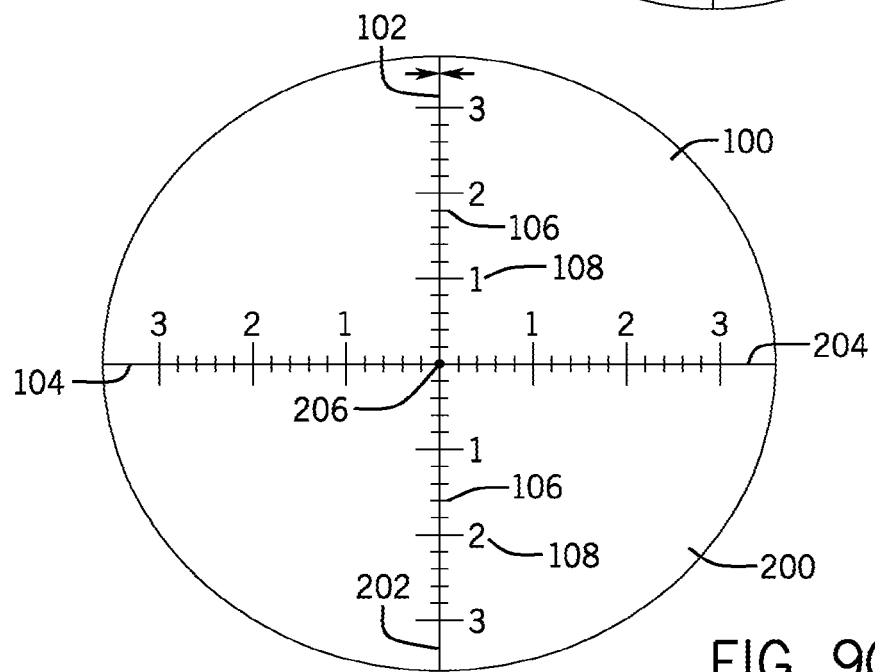
FIG. 9C is a view as seen when looking through a conventional dual plane optical sighting device having stadia lines and subtension marks on the first and second focal plane reticle showing the reticles in alignment.
Figure 10:
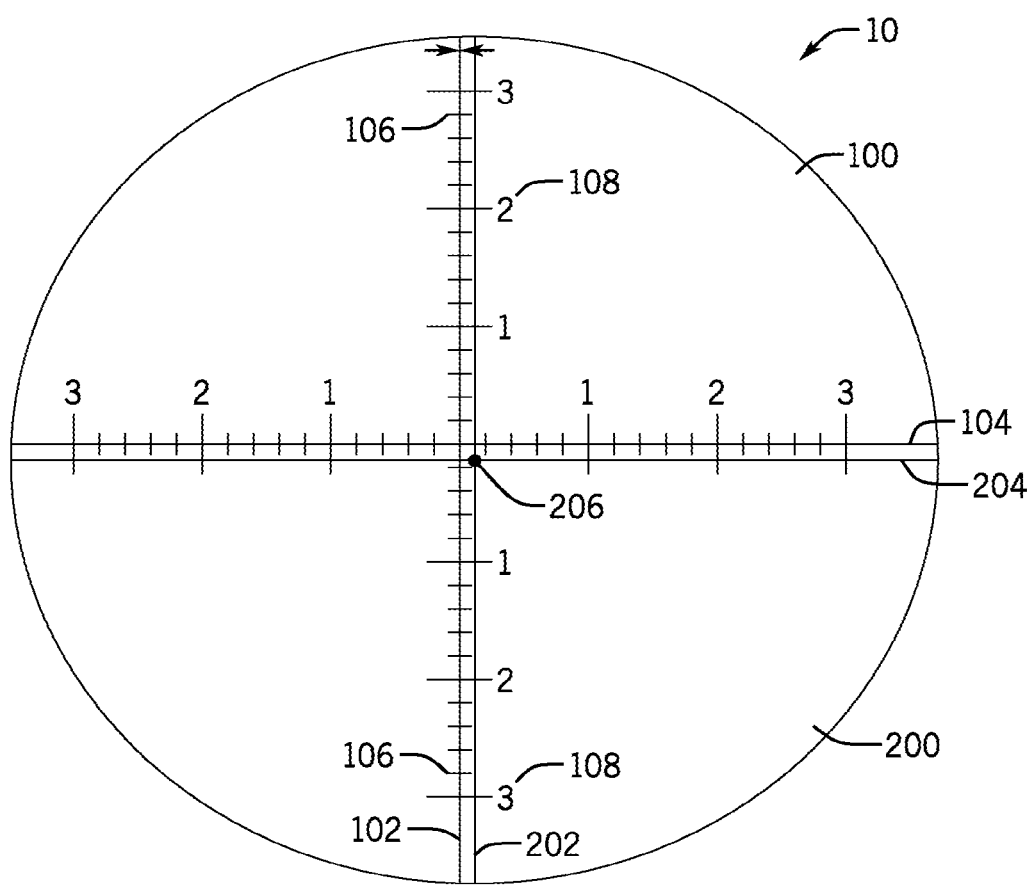
FIG. 10 is a view as seen when looking through a conventional dual plane optical sighting device having stadia lines and subtension marks on the first and second focal plane reticle showing the reticles out of alignment and with the optical sighting device in a zoomed out position.
Figure 11:
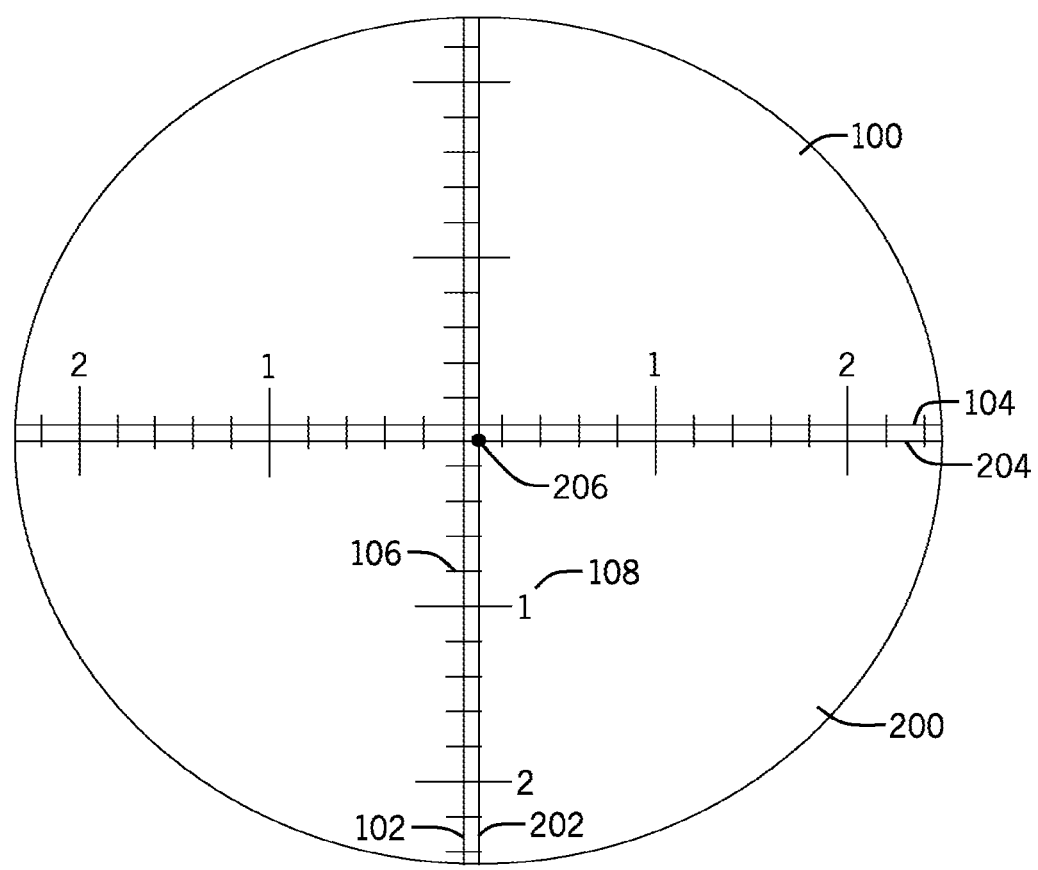
FIG. 11 is a view as seen when looking through a conventional dual plane optical sighting device having stadia lines on the first and second focal plane reticle showing the reticles out of alignment and with the optical sighting device in a zoomed in position.

The alignment issue identified above may be addressed by separating elements of the reticles in the first and second focal planes and superimposing those elements, such that reticle markings in the first focal plane and reticle markings in the second focal plane are complimentary. One example of this alignment problem is shown in FIGS. 9-11, showing views through optical sighting device 10 including a first focal plane reticle 100 and a second focal plane reticle 200 are shown. As shown in FIG. 9, first focal plane reticle 100 (FIG. 9A) is disposed at first focal plane 20 and second focal plane reticle 200 (FIG. 9B) is disposed at second focal plane 30. First focal plane reticle 100 includes first focal plane vertical and horizontal stadia lines 102, 104. Second focal plane reticle 200 includes second focal plane vertical and horizontal stadia lines 202, 204. FIG. 9C shows the optical sighting device 10 in a zoomed out position and the reticles 100, 200 are in perfect alignment. In the embodiment shown, first focal plane reticle 100 also includes a plurality of subtension marks 106 and accompanying numbers 108 are distributed along the stadia lines 102, 104.

When the reticles 100, 200 are in perfect alignment, the first focal plane stadia lines 102, 104 are indistinguishable from second focal plane stadia lines 202, 204. If the reticles 100, 200 are out of alignment for any reason, however, including when the user simply moves his line of sight out of perfect alignment with center axis 150 (see FIGS. 1-2) of the optical sighting device 10, the user is presented with a view similar to that in FIG. 10, which shows first focal plane stadia lines 102, 104 visible separately from second focal plane stadia lines 202, 204. A view like the one in FIG. 10 is particularly confusing for the user because all of the lines are the same thickness, and it is not immediately apparent which stadia lines belong to which reticle. When the optical sighting device 10 is zoomed in as shown in FIG. 11, first focal plane stadia lines 102, 104, subtension lines 106, numbers 108, and any other markings increase in size and thickness, but second focal plane stadia lines 202, 204 and target dot 206 do not change. The increased thickness of the lines on first focal plane reticle 100 tends to obscure more of the field of view than the user would prefer.

Figure 12:
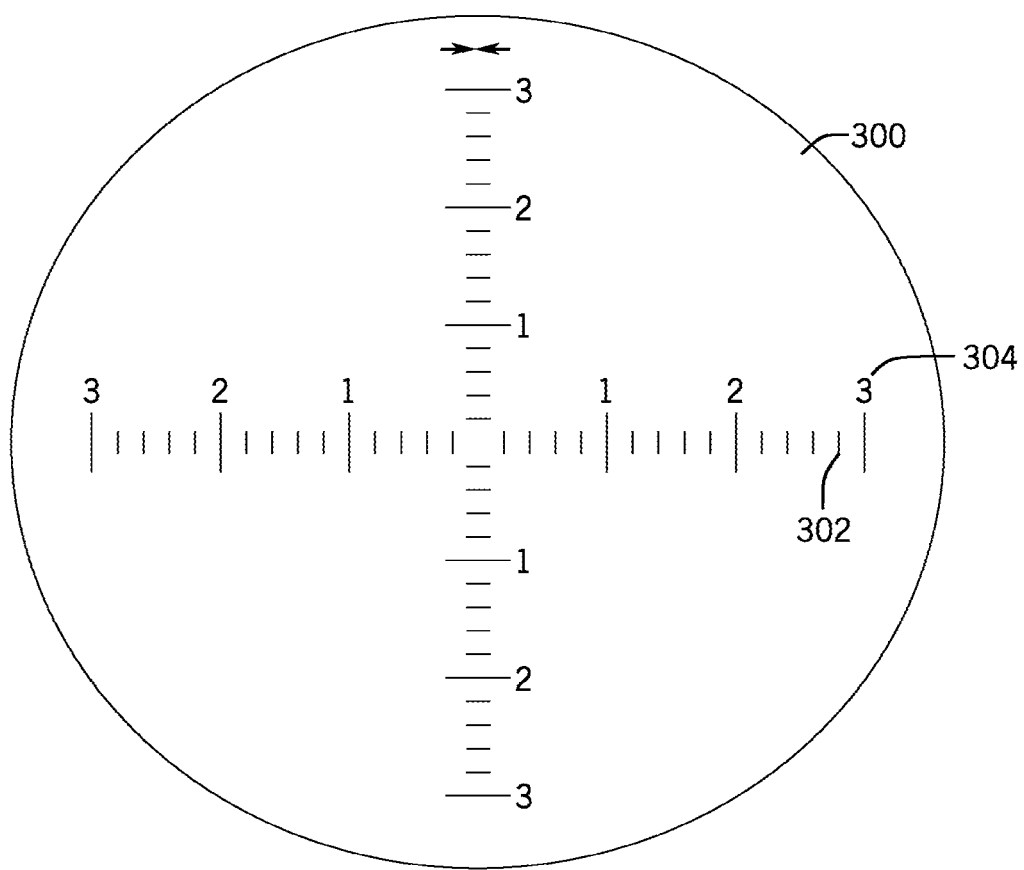
FIG. 12 is a view as seen through an optical sighting device of a glass etched reticle having subtension lines.
Figure 13:
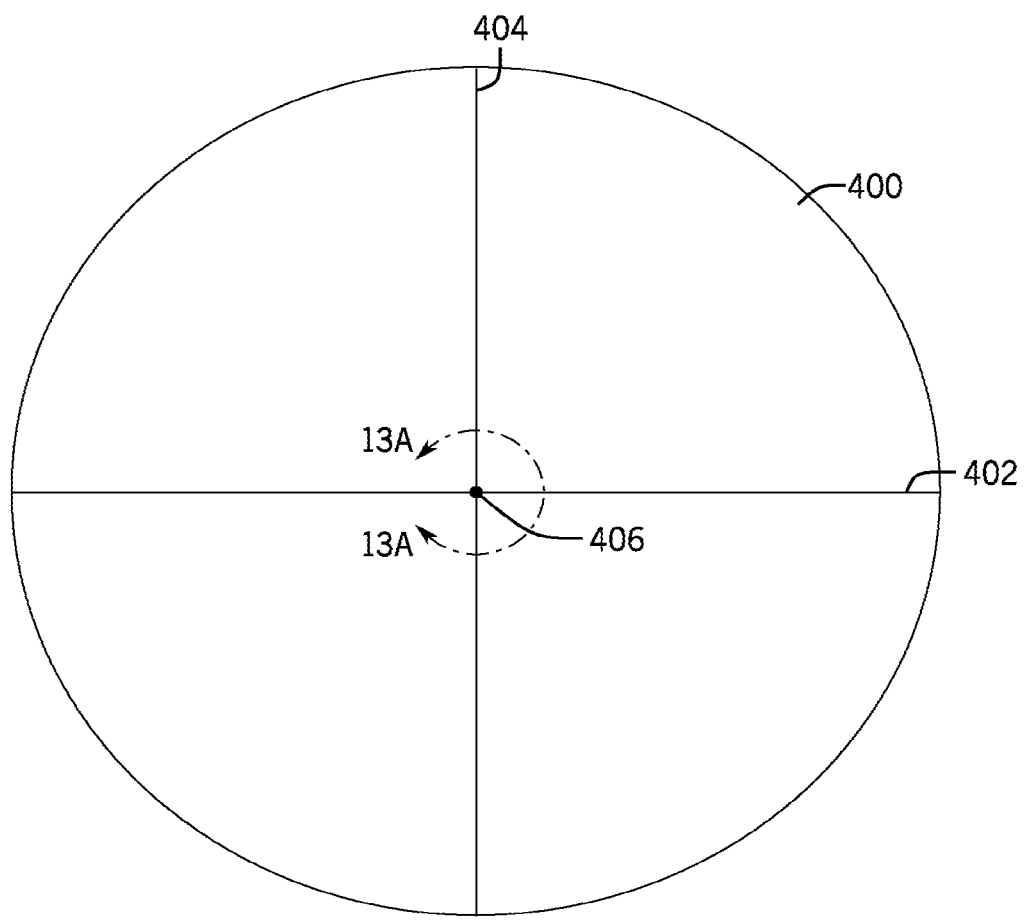
FIG. 13 is a view as seen through an optical sighting device of a wire reticle having vertical and horizontal stadia lines and a target dot.

FIGS. 12 and 13 illustrate a solution to the alignment problems described above, namely separating elements of the reticles in the first and second focal planes such that the first focal plane and second focal plane markings are superimposed or complimentary when viewed through the eyepiece of the device. For example, FIG. 12 shows a glass etched reticle 300 having subtension lines 302 and numbers 304, but no stadia lines. On its own, glass etched reticle 300 would be difficult to use. Of course, any other suitable markings may also be included in glass etched reticle 300 without departing from the invention. In this embodiment, glass etched reticle 300 is disposed at the first focal plane 20.

Figure 13A:
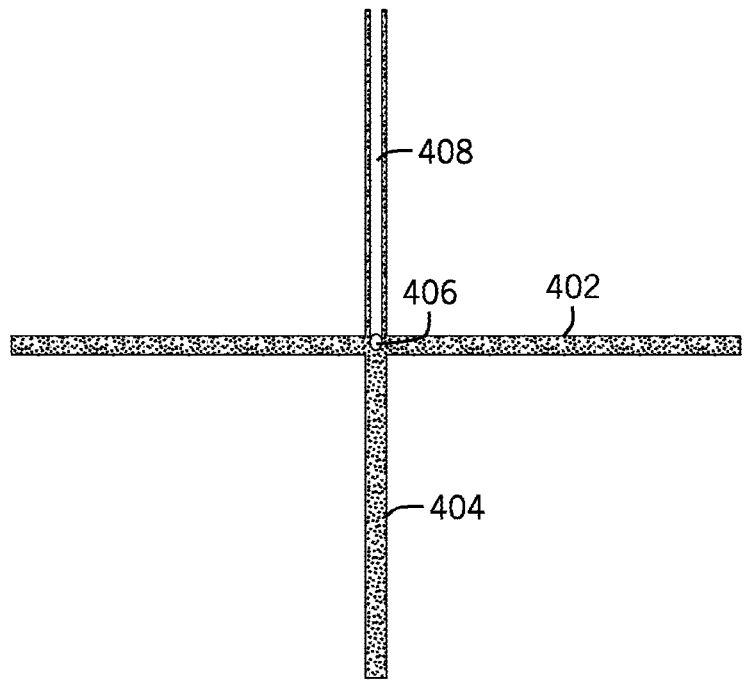
FIG. 13A is a detail schematic view of the wire reticle of FIG. 13 taken generally along the line A-A in FIG. 13.

FIG. 13 shows a wire reticle 400 having vertical and horizontal stadia lines 402, 404, and a target dot 406. Wire reticle 400 does not include any subtension lines and is disposed at the second focal plane 30 in this embodiment. In one embodiment of the present invention, wire reticle 400 may include an illuminated target dot 406. As shown in FIG. 13A, illuminated target dot 406 may be illuminated by an optic fiber 408, which may be aligned with and track along one of the stadia lines 402, 404. The optic fiber 408 shown in FIG. 13A is exaggerated to make it visible in the illustration, but in practice, the optic fiber appears to disappear into the wire stadia line 402, 404 and, except for the illuminated target dot 406, is not visible to the user. Although in the embodiment shown, optic fiber 408 is positioned in front of vertical stadia line 404, it may be positioned in front of the horizontal stadia line 402 or any other wire included in wire reticle 400 without departing from the invention.

Figure 13B:
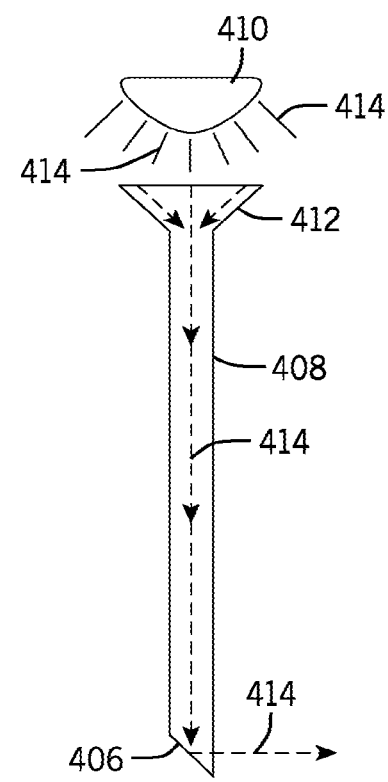
FIG. 13B is a side schematic view of one embodiment of an optic fiber target dot used with a wire reticle.

FIG. 13B shows a side view of optic fiber 408 and target dot 406, which appears as a bright dot to the user when an LED 410 is illuminated. LED 410 may be powered by a battery, and may be any suitable color. It may also be possible to provide an LED 410 that can change color, allowing the user to select a preferred color. One end of optic fiber 408 may optionally include a light collector 412, which acts as a funnel of sorts to capture as much light 414 as possible. The other end of optic fiber 408 is cut at a 45 degree angle, which reflects the light passing through the fiber toward the eye of the user. Light 414 is collected by light collector 412, passes through optic fiber 408, and reflects off of target dot 406, before traveling to the eye of the user. The targeting dot 406 visible to the viewer is actually light 414 reflecting off of the 45 degree cut of the end of optic fiber 408. As the light passes through optic fiber 408 and illuminates the end of the optic fiber opposite the light source. Thus, in an alternative embodiment, optic fiber 408 may include a 90° bend at the location of the target dot 406 so that the end of optic fiber 408 opposite the light source points toward the user's eye without having to cut the optic fiber at an angle. Although LED 410 is described here to illuminate the target dot 406 in the embodiment shown, any suitable light source may be used without departing from the invention, such as a prism, OLED system, other non-LED lamp, or by exposing loops of optic fiber 408 to ambient light that may be collected and transmitted to target dot 406.

Aligning glass etched reticle 300 and wire reticle 400 creates the illusion of viewing a single reticle when viewed through the optical sighting device 10. Unlike existing dual focal plane optical sighting devices that include reticles having markings that overlay each other as described above, using glass etched reticle 300 in combination with wire reticle 400 eliminates any double vision issues as shown in FIGS. 9-11.

Figure 14:
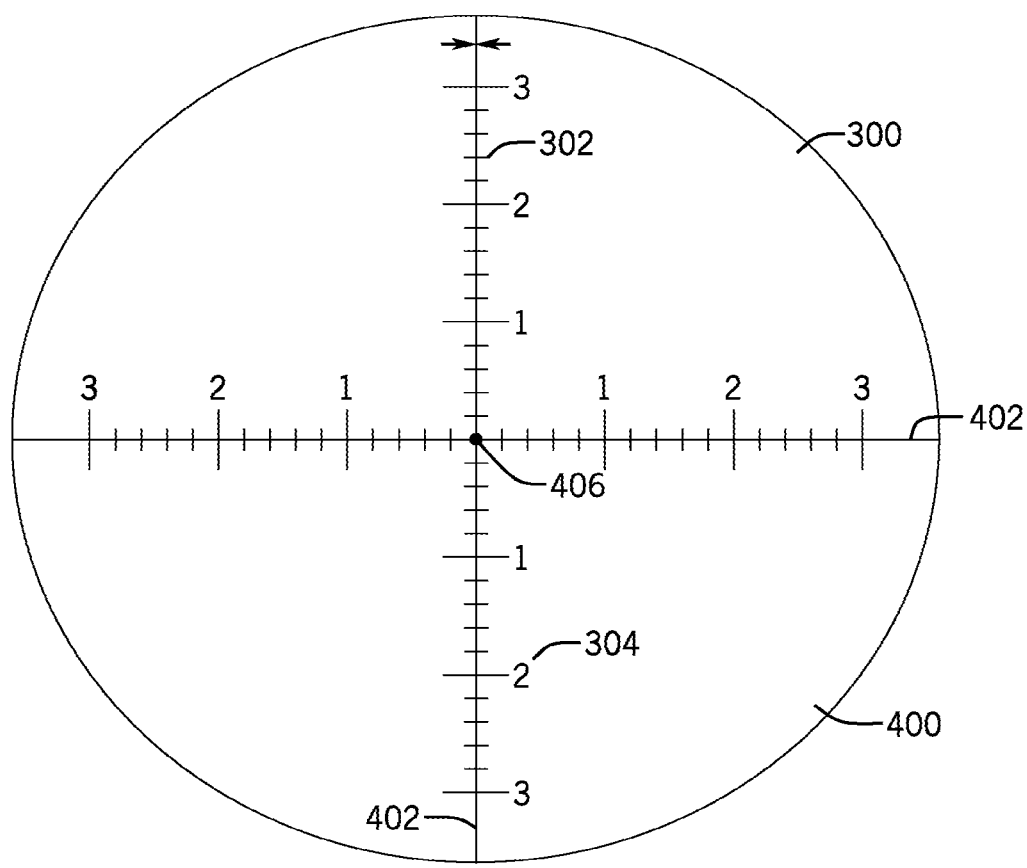
FIG. 14 is a view as seen through a dual focal plane optical sighting device in accordance with the invention having the glass reticle of FIG. 12 at the first focal plane and the wire reticle of FIG. 13 at the second focal plane, showing the reticles in alignment and the scope in a zoomed out position.
Figure 15:
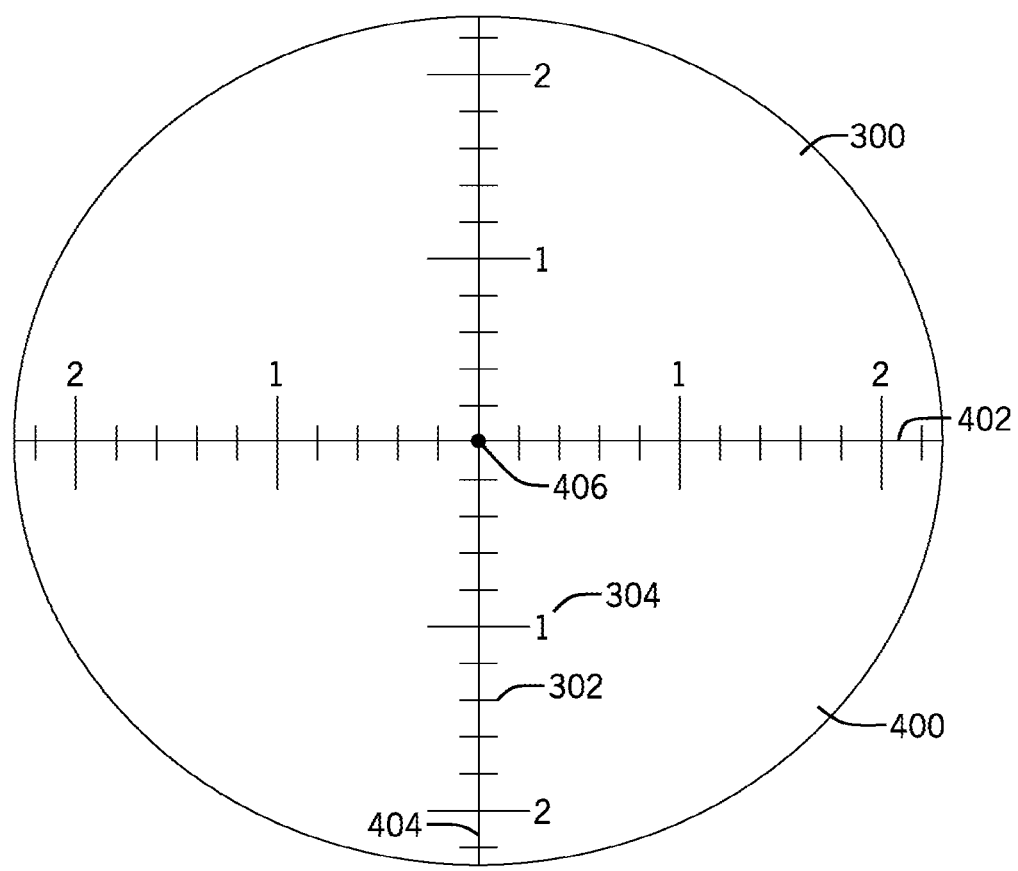
FIG. 15 is a view as seen through the dual focal plane sighting device of FIG. 14, showing the reticles in alignment and the scope in a zoomed in position.

FIG. 14 shows a view through a dual focal plane optical sighting device 10 in accordance with the invention showing glass etched reticle 300 (FIG. 12) and wire reticle 400 (FIG. 13) in perfect alignment and with the optical sighting device in a zoomed out position. The view shown in FIG. 14 is nearly identical to the one shown in FIG. 9. FIG. 15 shows another view through dual focal plane optical sighting device 10 showing the device in a zoomed in position. In the zoomed in position, the marks on the glass etched reticle 300 increase in size and thickness, but the stadia 402, 404 and targeting dot 406 on the wire reticle 400 remain the same size. FIG. 15 shows the reticles 300, 400 in perfect alignment as well.

Figure 16:
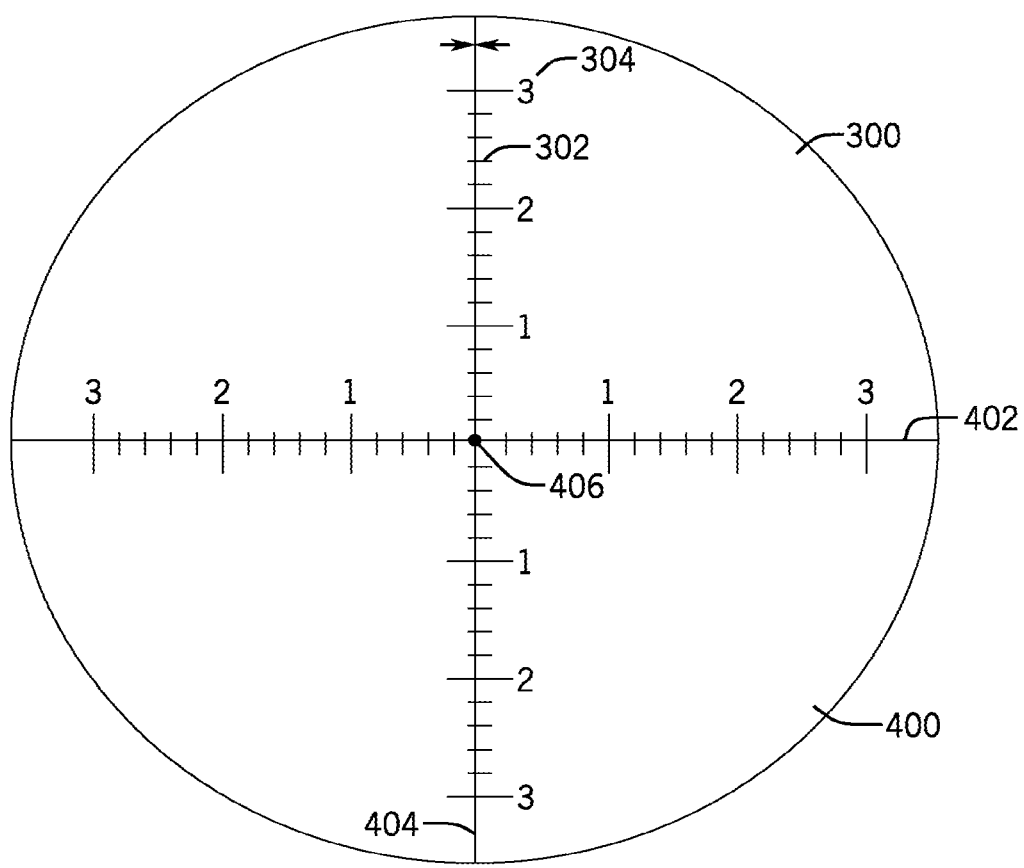
FIG. 16 is a view as seen through the dual focal plane sighting device of FIG. 14, showing the reticles out of alignment and the scope in a zoomed out position.
Figure 17:
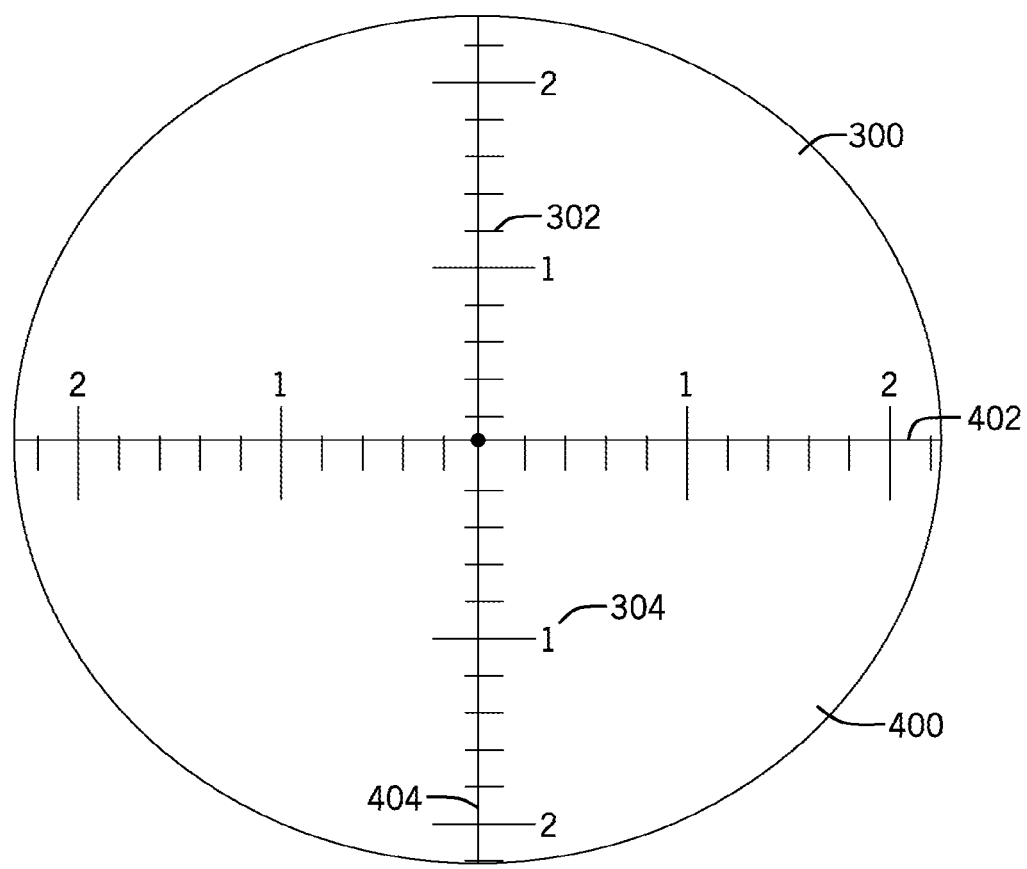
FIG. 17 is a view as seen through the dual focal plane sighting device of FIG. 14, showing the reticles out of alignment and the scope in a zoomed in position.

FIG. 16 shows what happens if the reticles 300, 400 are misaligned or the user moves his line of sight off axis and the optical sighting device 10 is in a zoomed out position. Unlike the view of FIG. 10, where there are two sets of stadia lines 102, 104, 202, 204 that the user must differentiate, stadia are only included on wire reticle 400. Thus, despite even a slight misalignment as shown in FIG. 16 is much less obvious, and the optical sighting device 10 remains easily usable. The same is true even when the optical sighting device 10 is in a zoomed in position as shown in FIG. 17. Even though the marks on the glass etched reticle 300 increase in thickness and size, there are no thickened stadia lines that the user must contend with, making the field of view much more usable. Of course, any other markings may be included on glass etched reticle 300 and variations to the stadia lines 402, 404, the targeting dot 406, or any other marking on the wire reticle 400 may be used without departing from the invention.

Figure 18A:
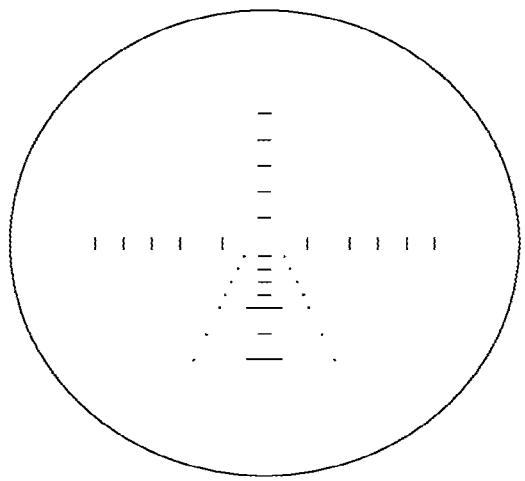
FIGS. 18A-C are embodiments of alternative first focal plane reticle patterns for use with the dual focal plane sighting device of FIG. 14.
Figure 18B:
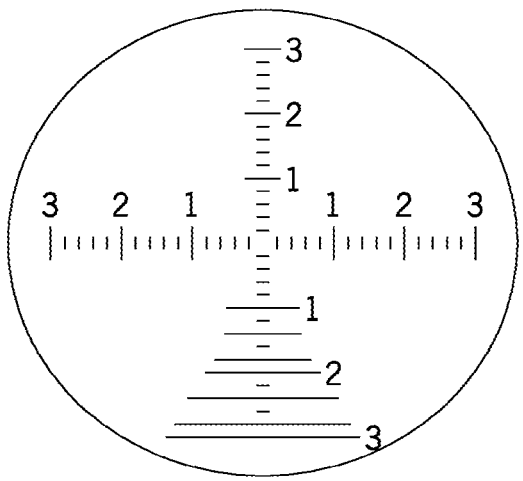
Figure 18C:
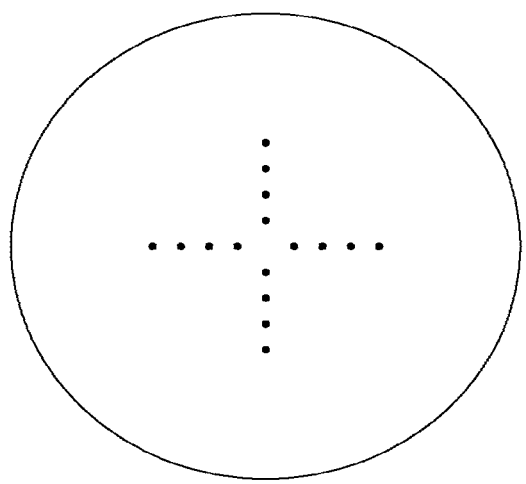

FIGS. 18A-C show some exemplary examples of additional reticle patterns that may be included in the first focal plane. Of course, any other suitable reticle pattern may be used without departing from the invention.

Additionally, the previously described electronic reticle 70 may be used in the first focal plane 20, wherein the electronic reticle 70 would not include the vertical and horizontal stadia lines present in wire reticle 400. The flexibility of the electronic reticle 70 display is ideal for providing a shooter with a variety of reticle pattern options, which could be superimposed over the features of wire reticle 400. FIG. 18A is a Although the invention has been herein described in what is perceived to be the most practical and preferred embodiments, it is to be understood that the invention is not intended to be limited to the specific embodiments set forth above. Rather, it is recognized that modifications may be made by one of skill in the art of the invention without departing from the spirit or intent of the invention and, therefore, the invention is to be taken as including all reasonable equivalents to the subject matter of the appended claims and the description of the invention herein.

What is claimed is:

1. An optical sighting device comprising:
a body with a first end and a second end and having a center axis;
an objective lens system disposed within the body;
an eyepiece lens disposed within the body;
an erector lens system disposed within the body; the objective lens system, eyepiece lens, and erector lens system forming an optical system having a first focal plane and a second focal plane, the first focal plane proximate the objective lens system and the second focal plane proximate the eyepiece lens;
a first reticle at the first focal plane;
a second reticle at the second focal plane, wherein the second reticle is a wire reticle;
the first reticle including at least one first marking;
the second reticle having at least one target dot illuminated by an LED, the target dot comprising an optic fiber having a first end and a second end, the first end including a light collector and the second end including an angled cut wherein the light from the LED passes through the optic fiber and reflects off of the angled cut; and
wherein the at least one first marking and the at least one target dot second marking provide complementary markings creating the appearance of a single reticle when viewed along the center axis.

2. The optical sighting device of claim 1, wherein the first reticle is a glass etched reticle.

3. The optical sighting device of claim 2 wherein the first reticle includes at least one subtension marking.

4. The optical sighting device of claim 2 wherein the first reticle includes mil dot markings.

5. The optical sighting device of claim 1, wherein the second reticle includes at least one stadia line.

6. The optical sighting device of claim 1, wherein the first reticle has a pattern of markings.

7. The optical sighting device of claim 1, wherein the optic fiber is aligned with and tracks along a stadia line.

8. An optical sighting device comprising:
a body with a first end and a second end and having a center axis;
an objective lens system disposed within the body;
an eyepiece lens disposed within the body;
an erector lens system disposed within the body; the objective lens system, eyepiece lens, and erector lens system forming an optical system having a first focal plane and a second focal plane, the first focal plane proximate the objective lens system and the second focal plane proximate the eyepiece lens;
a first reticle at the first focal plane;
a second reticle at the second focal plane;
the first reticle including at least one first marking;
the second reticle including at least one second marking;
wherein the at least one first marking and second marking do not overlap each other when viewed along the center axis; and
wherein the second reticle is a wire reticle, and further wherein the second reticle has at least one target dot illuminated by an LED, the target dot comprising an optic fiber having a first end and a second end, the first end including a light collector and the second end including an angled cut wherein the light from the LED passes through the optic fiber and reflects off of the angled cut.

9. The optical sighting device of claim 8, wherein the optic fiber is aligned with and tracks along a stadia line.

* * * * *